United States Patent
Liphardt et al.

(10) Patent No.: US 7,304,792 B1
(45) Date of Patent: Dec. 4, 2007

(54) SYSTEM FOR SEQUENTIALLY PROVIDING ABERATION CORRECTED ELECTROMAGNETIC RADIATION TO A SPOT ON A SAMPLE AT MULTIPLE ANGLES OF INCIDENCE

(75) Inventors: Martin M. Liphardt, Lincoln, NE (US); John A. Woollam, Lincoln, NE (US)

(73) Assignee: J.A. Woollam Co., Inc., Lincoln, NE (US)

( * ) Notice: Subject to any disclaimer, the term of this patent is extended or adjusted under 35 U.S.C. 154(b) by 0 days.

(21) Appl. No.: 11/397,393

(22) Filed: Apr. 5, 2006

Related U.S. Application Data

(63) Continuation-in-part of application No. 10/928,904, filed on Aug. 27, 2004, now abandoned.

(60) Provisional application No. 60/497,492, filed on Aug. 25, 2003.

(51) Int. Cl.
   *G02B 21/06* (2006.01)
   *G02B 21/00* (2006.01)
(52) U.S. Cl. ............ 359/385; 359/368; 359/389; 356/445
(58) Field of Classification Search ........ 359/368–390, 359/431, 350, 725–732, 637; 356/445, 328
   See application file for complete search history.

(56) References Cited

U.S. PATENT DOCUMENTS

| | | | |
|---|---|---|---|
| 3,748,015 A | 7/1973 | Offner | 359/366 |
| 4,650,315 A * | 3/1987 | Markle | 355/43 |
| 4,688,904 A * | 8/1987 | Hirose et al. | 359/729 |
| 5,045,704 A | 9/1991 | Coates | 250/372 |
| 5,136,413 A * | 8/1992 | MacDonald et al. | 359/213 |
| 5,347,364 A * | 9/1994 | Kawasaki et al. | 356/445 |
| RE34,783 E | 11/1994 | Coates | 250/372 |
| 5,486,701 A | 1/1996 | Norton et al. | 250/372 |
| 5,608,526 A | 3/1997 | Piwonka-Corle et al. | 356/369 |
| 5,627,613 A * | 5/1997 | Kaneko | 351/221 |
| 5,760,952 A * | 6/1998 | Koetke | 359/389 |
| 5,859,424 A | 1/1999 | Norton et al. | 250/226 |
| 5,917,594 A | 6/1999 | Norton | 356/327 |
| 6,141,100 A | 10/2000 | Burka et al. | 356/451 |
| 6,522,403 B2 * | 2/2003 | Wilson et al. | 356/328 |
| 6,744,505 B1 | 6/2004 | Wang et al. | 356/326 |
| 6,835,933 B2 * | 12/2004 | Lin et al. | 250/339.05 |
| 6,975,451 B2 * | 12/2005 | Sander | 359/389 |
| 2004/0125369 A1 | 7/2004 | Wang | |

FOREIGN PATENT DOCUMENTS

EP  452 963 A2 *  10/1991  .......... 359/366

* cited by examiner

*Primary Examiner*—Thong Q Nguyen
(74) *Attorney, Agent, or Firm*—James D. Welch

(57) ABSTRACT

A system for sequentially providing electromagnetic radiation to a spot on a sample at different angles of incidence, and after reflection therefrom into a detector. The system includes a plurality of spherical mirrors, and a refractive element for correcting aberration.

9 Claims, 2 Drawing Sheets

SYSTEM FOR SEQUENTIALLY PROVIDING ABERATION CORRECTED ELECTROMAGNETIC RADIATION TO A SPOT ON A SAMPLE AT MULTIPLE ANGLES OF INCIDENCE

This application is a CIP of Ser. No. 10/928,904 filed Aug. 27, 2004, (now abandoned), and therefrom claims benefit of provisional application Ser. No. 60/497,492 filed Aug. 25, 2003.

TECHNICAL FIELD

The disclosed invention relates to systems for providing electromagnetic radiation to a spot on a sample, and more particularly to a system for sequentially providing electromagnetic radiation to a spot on a sample at a multiplicity of angles of incidence, and after reflection therefrom to a detector, said system comprising a plurality of spherical mirrors and refractive means for correcting aberration.

BACKGROUND

It is known, in the practice of spectrophotometry and ellipsometry and the like, to direct electromagnetic radiation onto small spots on samples.

Patents to Coates Nos. 5,045,704 and RE: 34,783, for example, describe a system which applies a reflective objective lens to direct electromagnetic radiation provided to it by a convex reflective element to a spot on a sample. Said electromagnetic radiation is provided to said convex reflective element via a beam splitter. It is noted that the concave reflective objective lens disclosed in said Coates Patents is of a donut shape, which can be more difficult to manufacture than a plurality of spherical concave mirrors.

A U.S. Pat. No. 5,917,594 to Norton describes a system for providing a beam of electromagnetic radiation to a small spot on a sample utilizing a sequence of aberration correcting refractive elements, and a spherical mirror. It is noted that only incident light is passed through said aberration correcting refractive element.

Additional Patents to Norton et al. include Nos. 5,486,701 and 5,859,424, and a Patent to Piwonka-Corle et al., No. 5,608,526. Said Patents describe use of spherical reflective focusing elements to converge a beam of electromagnetic radiation into a small spot on a sample.

U.S. Pat. No. 6,744,505 B1 to Wang et al. is disclosed as it describes use of a concave reflecting optics to direct diverging diffracted electromagnetic radiation into a collimated beam which enters a detector. Further disclosed is a Published Application of Wang et al. is No. 2004/0125369 A1.

U.S. Pat. No. 3,748,015 to Offner is disclosed as it describes an imaging system comprising two elements:

a) a concave spherical mirror; and b) a convex spherical mirror;

said elements being arranged such that electromagnetic radiation caused to approach the concave spherical mirror reflects at a first location thereon and is reflected to said convex spherical mirror, from which it reflects onto a second location of said concave spherical mirror, from which it reflects as a beam of electromagnetic radiation, which, if the electromagnetic radiation caused to approach the concave spherical mirror at a first location was, for instance, an imaged aperture, appears as a small spot on the sample. It is emphasized that a collimated electromagnetic beam is not "focused" by the 1:1 imager, but rather a substantially point source is imaged thereby.

Patents identified by the Examiner in examination of the Parent application Ser. No. 10/928,904 are:

4,650,315 to Markle;
6,835,933 to Lin et al.;
5,136;413 to NacDonald et al.;
4,688,904 to Hirose et al.;
6,141,100 to Burka et al.

An additional clever combination of refractive and reflective optics to provide aberration corrected small spots of electromagnetic radiation onto samples would provide utility, particularly if it allowed selection of angles-of-incidence at which a beam impinges on a sample.

DISCLOSURE OF THE INVENTION

The disclosed invention system sequentially comprises a substantially planar mirror, aberration correction system, a convex spherical mirror, at least two concave spherical mirrors, aberration correction system.

In use said substantially planar mirror directs a beam of electromagnetic radiation to reflect therefrom and proceed as a beam which reflects from convex spherical mirror to one of said at least two concave spherical mirrors which focuses it, as incident beam to a spot on sample. Reflected electromagnetic radiation from said spot on said sample is then collected by the second of said at least two concave spherical mirrors, which reflectively directs it to reflect from convex spherical mirror and emerge as output Beam. Said input and output beam aberration correction system is positioned so that both input and output beams pass therethrough. The aberration correction system is preferably achromatic and of approximately zero power and is necessary because the electromagnetic beams approach and reflect from the spherical mirrors along an off-axis locus.

An improvement is that said substantially planar mirror is movable, such as by being mounted to a slider element, so as to enable its directing said beam of electromagnetic radiation toward said convex spherical mirror at different locations thereon, such that it is then caused to approach said sample at determinable angles-of-incidence.

It is further disclosed that duplicate systems, as described above, can be provided and oriented so as to direct a beam of electromagnetic radiation produced thereby toward the convex spherical mirror thereof at an angle offset from the beam of electromagnetic radiation produced by other said duplicate systems, said offset angle being viewed as a rotation angle from above said convex spherical mirror. Where the substantially planar mirror in each system is positioned at a different distance from, for instance the center of the convex spherical mirror, then the beams provided to the sample by each system are at different angles-of-incidence.

The disclosed invention will be better understood by reference to the Detailed Description of this Specification in combination with reference to the drawings.

SUMMARY

It is therefore a purpose and/or objective of the disclosed invention to teach a system for providing electromagnetic radiation to a spot on a sample, sequentially at a multiplicity of angles of incidence, and after reflection of said beam therefrom into a detector, said system including a plurality of spherical mirrors, and a refractive means for correcting aberration.

It is another purpose and/or objective of the disclosed invention to teach applying a plurality of duplicate systems for providing electromagnetic radiation to a spot on a sample, sequentially at a multiplicity of angles of incidence, and after reflection of said beam therefrom into a detector, said system including a plurality of spherical mirrors, and a refractive means for correcting aberration, each oriented at some offset angle with respect to the other of said plurality of duplicate systems.

DETAILED DESCRIPTION

Figure 1:
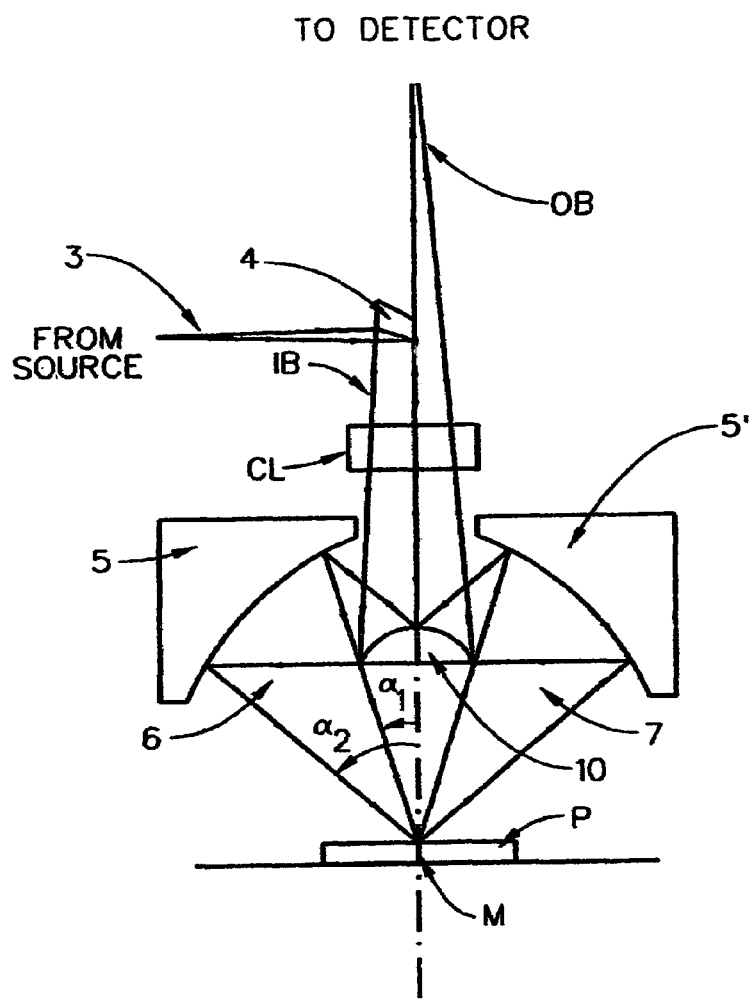
FIG. 1 shows the system of the disclosed invention.

FIG. 1 shows that the disclosed invention is a system comprising:
 substantially Planar Mirror (4);
 Convex Spherical Mirror (10);
 Concave Spherical Mirror (5);
 Concave Spherical Mirror (5');
 Aberration Correction System (CL).

In use substantially Planar Mirror (4) directs a beam of electromagnetic radiation (3) to reflect therefrom and proceed as Beam (IB) to reflect from Convex Spherical Mirror (10), to Concave Spherical Mirror (5) which focuses it, as Incident Beam (6) to a spot (M) on Sample (P), reflected electromagnetic radiation (7) from said Spot (M) on said Sample (P) being collected by Concave Spherical Mirror (5'), which reflectively directs it to reflect from Convex Spherical Mirror (10) and emerge as output Beam (OB).

Further, a beam of electromagnetic radiation (IB) reflects from a substantially Planar Mirror (4), then proceeds to reflect from Convex Spherical Mirror (10), to Concave Spherical Mirror (5) which focuses it, as Incident Beam to a spot (M) on Sample (P) at an angle-of-incidence. Reflected electromagnetic radiation from said Spot (M) on said Sample (P) is collected by Concave Spherical Mirror (5'), which directs it to reflect from Convex Spherical Mirror (10) and emerge as Beam (OB). Note in particular that an Aberration Correction System (CL) is present, and that both Input (IB) and Output Beams (OB) pass therethrough.

Said input (IB) and output (OB) Aberration Correction System (CL) is positioned so that both Input (IB) and Output (OB) Beams pass therethrough so that electromagnetic radiation reflected from each of the spherical mirrors (5) and (5') is corrected thereby for spherical aberration. This configuration for using the same refractive element (CL) to correct both incident and reflected electromagnetic radiation is believed unique over the prior art.

It is to be appreciated that the Spherical Mirrors (5) and (5') can be separate Mirrors and FIG. 1 does not necessarily imply a cross-sectional through a 360 Degree Donut/Torroidal Shaped Mirror.

Figure 3:
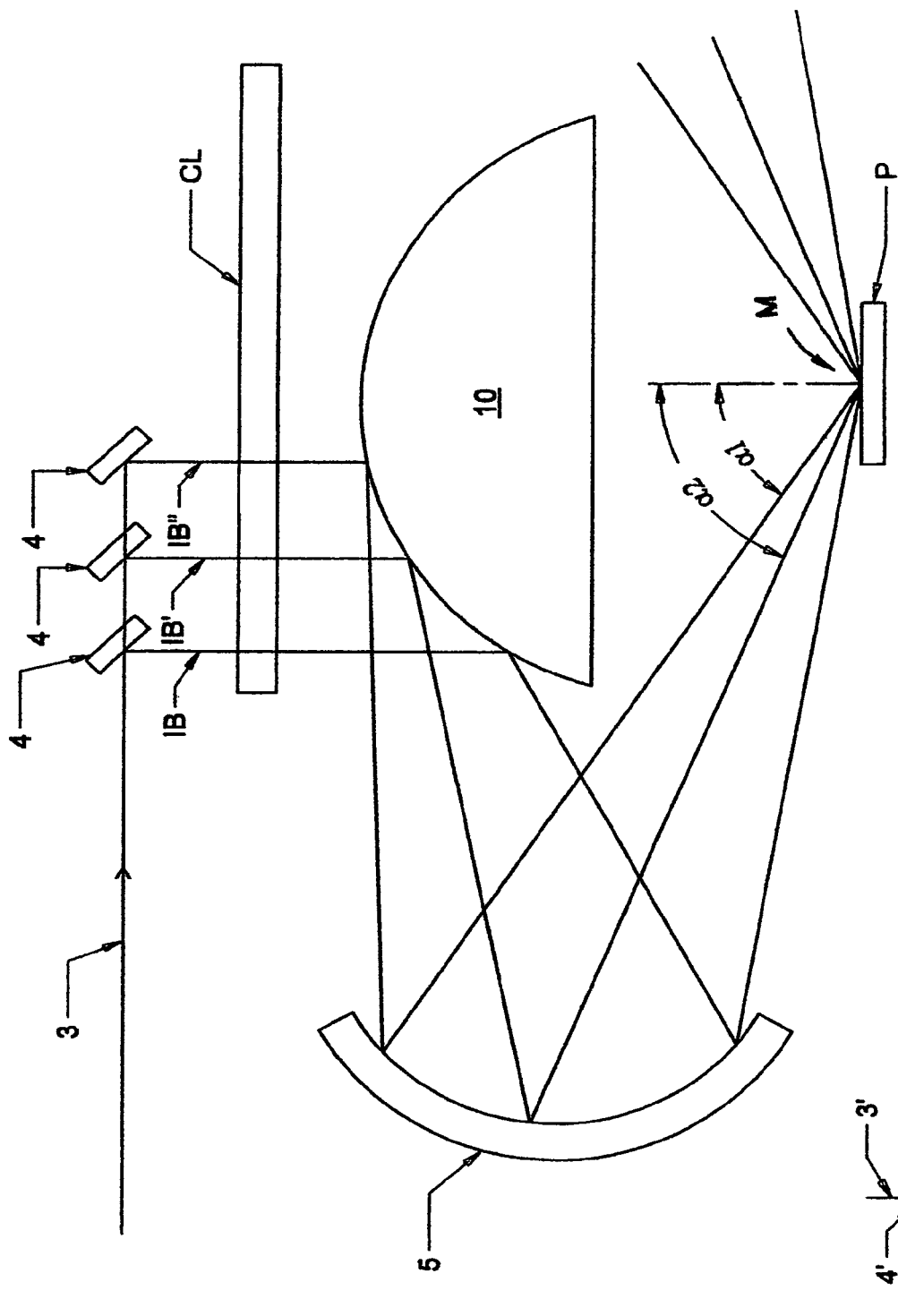
FIG. 3 shows an enlarged partial view of the system shown in FIG. 1, and demonstrates that substantially Planar Mirror (4) is can be caused to move into a plurality of horizontally located positions, the effect said positioning being to control the angle-of-incidence at which the beam eventually arrives at the Sample (P).

Importantly, the substantially Planar Mirror (4) is mounted on a slider or functional equivalent to enable its sequential positioning as demonstrated in FIG. 3.

Figure 2A:
FIGS. 2a, 2b and 2c show demonstrative lens configurations.
Figure 2B:
Figure 2C:
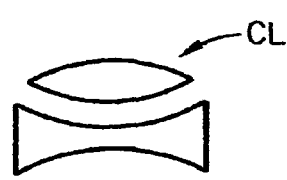

FIGS. 2a, 2b and 2c show possible configurations of lens elements. The FIG. 2a configuration can comprise elements made of Fused Silica and CaF2. While a FIG. 2b configuration would probably not be achromatic, it might perform an acceptable function. Preferred Lens Configurations, as shown in FIGS. 2a and 2c comprise multiple elements which can provide substantially achromatic characteristics. Also, it is preferred that the Lens System (CL) be of about Zero Power. Said Aberration Correction System (CL) can comprise a combination of two miniscus lenses, or be a bi-convex lens, or be of any functional refractive design.

Said input (IB) and output (OB) Aberration Correction System (CL) is positioned so that both Input (IB) and Output (OB) Beams pass therethrough.

A benefit of the shown focusing configuration is that it produces approximately circular spots on a sample (P), rather than an elongated spot typical when beam of electromagnetic radiation are directed onto a sample at an oblique angle.

No known system provides Separate Concave Spherical Mirrors (5) and (5') functionally positioned with the Convex Spherical Mirror (10) as shown in a FIG. 1. Note that additional Concave Spherical Mirrors could also be present and located as would result if (5) and (5') were rotated 90 Degrees about a vertically oriented line.

Turning now to FIG. 3 there is shown an enlarged partial view of the system shown in FIG. 1. Note that the substantially Planar Mirror (4) is shown in a plurality of horizontally located positions and the effect said positioning has on the angle-of-incidence at which the beam eventually arrives at the Sample (P). The effect is achieved by providing a substantially Planar Mirror (4) which has a relatively small reflective surface, as opposed to a reflective surface of a size to simultaneously provide reflected electromagnetic radiation over a large portion of Convex Spherical Mirror (10). Prior art systems have used a large reflective area substantially Planar Mirror (4). A working definition of a small reflecting area substantially Planar Mirror (4) is that the nominal angle-of-incidence effected at a sample (P) by a beam reflecting therefrom will comprise a standard deviation of not more that +/−2 degrees about the mean, although a larger standard deviation could still enable obtaining useful results. Importantly, the substantially Planar Mirror (4) is then mounted on a slider, or functional equivalent, to enable its sequential, angle-of-incidence changing positioning, as demonstrated in FIG. 3.

Note that in FIGS. 1 and 3 the symbols ($\alpha 1$) and ($\alpha 2$) indicate different angles of incidence, and in FIG. 3 (IB), (IB') and (IB'') indicate incident beam locations for different positions of the substantially Planar Mirror (4).

Figure 4:
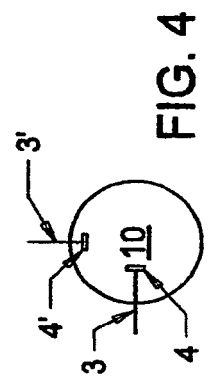
FIG. 4 is included to show that a plurality of duplicate systems can be oriented so as to direct beams of electromagnetic radiation (3) (3') produced thereby toward the Convex Spherical Mirror (10) thereof at offsets with respect to one another as viewed from above the Convex Spherical Mirror (10).

FIG. 4 is included to show that a plurality of duplicate systems can be oriented so as to direct beams of electromagnetic radiation (3) (3') produced thereby toward the Convex Spherical Mirror (10) thereof. Note that the angle at which the beam of electromagnetic radiation (3) approaches said Convex Spherical Mirror (10) is offset by a demonstrative 90 degrees from the beam of electromagnetic radiation (3') produced by a second said duplicate systems, where said offset angle is viewed as a rotation angle from above said Convex Spherical Mirror (10). Note also that the location of substantially Planar Mirrors (4) and (4') are not the same, as measured with, for instance, respect to the center of the Convex Spherical Mirror (10). As demonstrated in FIG. 3, different such positioning of substantially Planar Mirrors (4) and (4') allows simultaneous application of beams of electromagnetic radiation at more than one angle-of-incidence to sample (P). Further, separate monitoring of each beam after it emerges from the system as a beam (OB) of said system, via reflection from the Convex Spherical Mirror (10), is easily achieved. It is also mentioned that as Convex Spherical Mirror (10) is a single rotated element, FIG. 4 is demonstrative. There cound be more than two systems present, say three or four rotated at 60 or 45 degrees, respectively, to one another, or at any other angles with respect to one another.

Finally, as regards the Concave Spherical Mirrors (5) and (5'), where Patentability is supported by the angle-of-incidence controlling movability of substantially Planar Mirror (4), said Concave Spherical Mirrors (5) and (5') can be separate mirrors or regions of a torroidal mirror which is rotated about an axis co-linear with that about which Convex Spherical Mirror (10) is rotated. Where necessary to support Patentability, said Concave Spherical Mirrors (5) and (5') should be considered as separate elements.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A system comprising:
   substantially planar mirror (4);
   convex spherical mirror (10);
   first concave spherical mirror (5);
   second concave spherical mirror (5'); and
   aberration correction system (CL);
   such that in use substantially planar mirror (4) directs a beam of electromagnetic radiation (3) to reflect therefrom and proceed as beam (IB) to reflect from convex spherical mirror (10), to first concave spherical mirror (5) which focuses it, as incident beam (6) to a spot (M) on sample (P), reflected electromagnetic radiation (7) from said spot (M) on said sample (P) being collected by second concave spherical mirror (5'), which reflectively directs it to reflect from convex spherical mirror (10) and emerge as output beam (OB);
   said aberration correction system (CL) being positioned so that both input (IB) and output (OB) beams pass therethrough;
   said substantially planar mirror (4) being movable so as to enable said beam of electromagnetic radiation (3) to be directed toward said convex spherical mirror (10) at different locations thereon, such that said beam of electromagnetic radiation (3) approaches the same spot (M) on said sample (P) at determinable angles-of-incidence.

2. A system as in claim 1, in which the aberration correction system (CL) is achromatic and of approximately zero power.

3. A system as in claim 1, in which the aberration correction system (CL) is a combination of two miniscus lenses.

4. A system as in claim 1, in which the aberration correction system (CL) is a bi-convex lens.

5. An apparatus comprising at least two complete duplicates of a system, each thereof comprising:
   substantially planar mirror (4);
   first concave spherical mirror (5);
   second concave spherical mirror (5');
   said apparatus further comprising in common to at least two systems:
   a convex spherical mirror (10); and
   an aberration correction system (CL);
   such that in use, in each system, the substantially planar mirror (4) thereof directs a beam of electromagnetic radiation (3) to reflect therefrom and proceed as beam (IB) to reflect from convex spherical mirror (10), to first concave spherical mirror (5) which focuses it, as incident beam (6) to a spot (M) on sample (P), reflected electromagnetic radiation (7) from said spot (M) on said sample (P) being collected by second concave spherical mirror (5'), which reflectively directs it to reflect from convex spherical mirror (10) and emerge as output beam (OB);
   said aberration correction system (CL) being positioned so that both input (IB) and output (OB) beams in at least two systems pass therethrough;
   said substantially planar mirror (4) in each system being independently movable so as to enable said beam of electromagnetic radiation (3) to be directed toward said convex spherical mirror (10) at different locations thereon, such that it approaches the same spot (M) on said sample (P) at determinable angles-of-incidence;
   each of said duplicate systems being oriented so as to direct a beam of electromagnetic radiation (3) produced thereby toward the convex spherical mirror (10) at an angle offset from the beam of electromagnetic radiation (3) produced by other said duplicate systems, said offset angle being viewed as a rotation angle from above said convex spherical mirror (10).

6. A system as in claim 5, in which the aberration correction system (CL) in each of said at least one duplicate systems is achromatic and of approximately zero power.

7. A system as in claim 5, in which the aberration correction system (CL) in each of said at least one duplicate systems is a combination of two miniscus lenses.

8. A system as in claim 5, in which the aberration correction system (CL) in each of said at least one duplicate systems is a bi-convex lens.

9. A method of providing beam of electromagnetic radiation to a sample at a sequence of angles-of-incidence, comprising the steps of:
   a) providing a system comprising:
      substantially planar mirror (4);
      convex spherical mirror (10);
      first concave spherical mirror (5);
      second concave spherical mirror (5'); and
      aberration correction system (CL);
   such that in use substantially planar mirror (4) directs a beam of electromagnetic radiation (3) to reflect therefrom and proceed as beam (IB) to reflect from convex spherical mirror (10), to first concave spherical mirror (5) which focuses it, as incident beam (6) to a spot (M) on sample (P), reflected electromagnetic radiation (7) from said spot (M) on said sample (P) being collected by second concave spherical mirror (5'), which reflectively directs it to reflect from convex spherical mirror (10) and emerge as output beam (OB);

said aberration correction system (CL) being positioned so that both input (IB) and output (OB) beams pass therethrough;
  b) positioning said substantially planar mirror (4) so that said beam of electromagnetic radiation impinges on said sample at said spot (M) on at a first angle-of-incidence; and
  c) positioning said substantially planar mirror (4) so that said beam of electromagnetic radiation impinges on said sample at said spot (M) on a second angle-of-incidence.

* * * * *